United States Patent
Liu et al.

(10) Patent No.: US 9,338,164 B1
(45) Date of Patent: May 10, 2016

(54) TWO-WAY AUTHENTICATION USING TWO-DIMENSIONAL CODES

(71) Applicant: Symantec Corporation, Mountain View, CA (US)

(72) Inventors: Quentin Liu, San Jose, CA (US); William Gauvin, Leominster, MA (US); Robert Walters, Southern Shores, NC (US)

(73) Assignee: Symantec Corporation, Mountain View, CA (US)

( * ) Notice: Subject to any disclaimer, the term of this patent is extended or adjusted under 35 U.S.C. 154(b) by 87 days.

(21) Appl. No.: 14/252,724

(22) Filed: Apr. 14, 2014

(51) Int. Cl.
*H04L 29/06* (2006.01)

(52) U.S. Cl.
CPC ................... *H04L 63/0869* (2013.01)

(58) Field of Classification Search
CPC ............ H04L 63/0823; H04L 63/0853; H04L 63/0861; H04L 63/18; G06Q 20/40; G06Q 20/425; G06Q 20/3276; G06F 21/43; G06F 21/36; H04W 12/06
USPC .......................................................... 726/5
See application file for complete search history.

(56) References Cited

U.S. PATENT DOCUMENTS

| 2014/0096215 A1* | 4/2014 | Hessler | H04L 63/0869 726/7 |
| 2014/0173695 A1* | 6/2014 | Valdivia | G06F 21/36 726/4 |
| 2014/0282961 A1* | 9/2014 | Dorfman | H04L 63/0823 726/7 |

* cited by examiner

*Primary Examiner* — Harunur Rashid
(74) *Attorney, Agent, or Firm* — Wilmer Cutler Pickering Hale and Dorr LLP (57) ABSTRACT

A system for two-way authentication using two-dimensional codes is provided herein. The system includes a memory and a processor coupled to the memory. The processor is to receive a request from a remote device to access a web resource and to generate a two-dimensional code to be sent from the remote device to an authentication service to authenticate the web resource. The two-dimensional code includes an authentication request identifier. The processor is further to receive an authentication credential from the remote device, the authentication credential being obtained from the authentication service, and to authenticate the user of the remote device to the web resource using the authentication credential.

18 Claims, 5 Drawing Sheets

TWO-WAY AUTHENTICATION USING TWO-DIMENSIONAL CODES

FIELD

Embodiments of the invention relate to computer systems and in particular to authentication of users and networked services and systems using scanned, two-dimensional codes.

BACKGROUND

Each day consumers access a vast number of services and systems over the Internet through many different devices, including network-connected mobile devices, such as smartphones, tablets, and wearable devices. These devices may be used in conjunction with other network-connected device such as a personal computer or laptop. Security and authentication is a concern on all of these devices, both to prevent the devices from accessing other systems without the proper authorization and also to prevent unauthorized entities from accessing such exemplary network-connected devices. As more services have migrated into the networked world and with the increase of bring-your-own-device (BYOD) policies in the workplace, there is increasing need to ensure that the connected devices, systems, and services are legitimately authorized and authenticated to the servers and applications to which access is sought. Additionally, those bringing their devices to various networks and accessing important resources remotely, such as banking and shopping websites, want to ensure that personal information stored on and sent by their devices is not compromised.

SUMMARY

In some embodiments, a system for two-way authentication using two-dimensional codes is provided. The system includes a memory and a processor coupled to the memory. The processor is to receive a request from a remote device to access a web resource and to generate a two-dimensional code to be sent from the remote device to an authentication service to authenticate the web resource. The two-dimensional code includes an authentication request identifier. The processor is further to receive an authentication credential from the remote device, the authentication credential being obtained from the authentication service, and to authenticate the user of the remote device to the web resource using the authentication credential.

In some additional embodiments, the two-dimensional code further comprises an identifier of the authentication service and an identifier of the authentication service. The two-dimensional code is generated by a two-dimensional code generator provided by the processor according to information received from the authentication service. The authentication credential is received by the remote device from the authentication service in response to an authentication request sent by the remote device to the authentication service. The authentication request includes the authentication request identifier as extracted from the two-dimensional code. The authentication credential is received in response to a comparison between the authentication reference identifier and an expected value generated by the authentication service. The two-dimensional code includes policy information that describes a policy of the web resource. The remote device comprises a mobile device used to scan the two-dimensional code being displayed on a display of a client system. The authentication credential includes a public key used by the web resource to authenticate a user to an application running on the processor.

In some embodiments, a method for providing two-way authentication using two-dimensional codes is provided. The method includes steps of receiving a request from a remote device to access a web resource, the web resource operating on a processing device and of generating, by the processing device, a two-dimensional code to be sent from the remote device to an authentication service to authenticate the web resource. The two-dimensional code includes an authorization request identifier. The method also includes steps of receiving an authentication credential from the remote device, the authentication credential being obtained from the authentication service, and of authenticating the remote device to the web resource.

In some additional embodiments, the method further includes steps of providing the two-dimensional code to remote device in response to the request from the remote device to access the web resource. The two-dimensional code includes an identifier of the web resource and an identifier to the authentication service. The two-dimensional code is generated by the processor and is generated according to information received from the authentication service. The authentication service retains sufficient information to generate an expected value corresponding to the authentication request identifier embedded in the two-dimensional code. The authentication credential is received by the remote device in response to a comparison between the authentication reference identifier and an expected value generated by the authentication service. The authentication service receives policy information from the web resource, the policy information describing a policy of the web resource.

Some embodiments also include a non-transitory computer-readable storage medium including instructions that, when executed by a processor, cause the processor to perform a set of operations like those of the method described above.

BRIEF DESCRIPTION OF THE DRAWINGS

The present disclosure will be understood more fully from the detailed description given below and from the accompanying drawings of various embodiments of the present invention, which, however, should not be taken to limit the present disclosure to the specific implementations, but are for explanation and understanding only.

DETAILED DESCRIPTION

The increasing use of mobile devices, such as smartphones and tablets, has prompted the spread and acceptance of numerous technologies. Because smartphones and tablets commonly include a camera, or other visual scanning hardware, additional means of inputting information into the device have been created. The ability to use two-dimensional codes has become widespread. Thus, these mobile devices can be used to read barcodes and also quick response codes, frequently referred to as QR Codes®. Quick response codes are two-dimensional barcodes that present information in a matrix of black and white squares. In general, the more squares present in a given quick response code, the more information can be encoded therein.

Using a mobile device, a user can "scan" or take a picture of a quick response code, and an application running on the mobile device processes the code to extract information therefrom. The information can include alphanumeric characters and other characters that may serve as a uniform resource locator (URL). A conventional use of quick response codes is to provide an easy-to-use way for a user to access a website. Rather than entering a URL in a web browser by typing the information in using a physical keyboard or a touch-screen-based keyboard, a user may scan the quick response code using the mobile device's scanner (e.g., a camera in many consumer-focused mobile devices). A URL is extracted from the quick response code and the mobile device's web browser accesses the corresponding web site or an associated remote application. The remote application may be any of several remote resources such as a computing resource, a storage resource, and/or a networking resource. Given the smaller dimensions of mobile devices and the relative difficulty in entering a URL manually on such a device, the quick response code may provide considerable convenience. Some mobile devices, such as smart-glasses, smart-watches, or other wearable mobile devices, may have particularly limited input mechanisms. For example, such devices may provide for visual input by a camera, and audio input by a microphone, while not providing an alphanumeric input device. Or the alphanumeric device may be of such a small scale as to increase the difficulty of its use in certain circumstances. The use of quick response codes to access resources may be a necessity for such mobile devices.

Because of the convenience and because the circumstances in which mobile devices are often used can entail limited attention by the user, malicious uses can be made by manipulating quick response codes. When a user types a URL into a web browser, that user is more likely to notice if the URL was mistyped and is incorrect or if the URL appears suspect (e.g. the URL specifies a .net top level domain rather than a .com TLD) than if the user has scanned a quick response code in an attempt to access a URL. For example, a malicious actor could place a sticker over a hard copy of a quick response code on a promotional brochure. The context and ease of use may prevent the user from carefully monitoring whether the quick response code takes it to the intended website, as indicated by the context in which the quick response code is found, or not. In some circumstances, a quick response code may be featured in a dynamic display, such as an electronic billboard or on a website. In such circumstances, if the malicious actor hacks the website or electronic billboard and causes it to display a quick response code that misdirects the user to a location not intended or desired by the user, the user may not notice it at all. From the context, there may be nothing to signal to the user that the URL leads or has led to an undesired location.

Aspects of the present disclosure prevent such misdirection by providing a security wrapper that runs on the mobile device and intercepts requests to access a URL after scanning a quick response code. The security wrapper may communicate over a secure communication channel with an authentication service to verify that the URL identifies a legitimate, or approved, website or application. Approved websites may be included in a lookup table that is part of the authentication service. The authentication service may verify the authenticity or the URL obtained from the quick response code and send authentication or approval information back to the mobile device. The security wrapper can then interpret the authentication information and provide one or more visual, audio, and/or tactile signals to the user that the URL is an approved URL that will not redirect the mobile device user for malicious purposes when that is the case, and provide a different signal when the URL should not be followed. Thus, the security wrapper may provide a consumer with indications of when a scanned quick response code is approved, when no approval status is given, and also when a quick response code should not be followed. For example, the lookup table of the authentication service may include a whitelist and/or a blacklist.

In some implementations, to facilitate the authentication of the quick response code, the quick response code can be obtained from an authentication service provider that operates an authentication service or generated using information provided by the authentication service. In this way, and as described in further detail herein, the authentication service is able to authenticate particular quick response codes (e.g., quick response codes generated by or in connection with the authentication service). For a web application or web service provider trying to prevent bad actors from targeting its users, the provider can request quick response codes from the authentication service. These providers may request the authenticating quick response codes in advance or dynamically as the need arises. Thus, in this way a mobile device user can determine whether a quick response code is approved or not. The provider may thereby promote the trust that its users place in it.

According to some aspects of the present disclosure, a third-party authentication system is provided that can coordinate the creation and use of quick response codes for authenticating a network-based resource to the user. The authentication service may permit the creation of a two-dimensional code. The authentication service may also receive an authentication request through a network, like the Internet, and extract information from the authentication request that is obtained from the two-dimensional code. An authentication request identifier may be extracted from the authentication request. The authentication request identifier may be a string of characters that is unique to the two-dimensional code from which it is extracted by a user device and used in determining whether the network-based resource is the resource expected by the user or approved by the authentication service. Thus, the authentication request identifier is embedded in the two-dimensional code at the time of its creation. The authentication service may compare an authentication request identifier, obtained from the two-dimensional code, with an expected value to create an authentication indication and then transmit that authentication indication to a mobile device user to obtain information from the two-dimensional code. The expected value may be a string of characters generated in the same way as the authentication request identifier. For example, both the authentication request identifier and the expected value may be based on a URL of the network-based resource processed with the same algorithm. Thus, a match may indicate that the resource is considered to be an approved resource by an authentication service provider.

Figure 1:
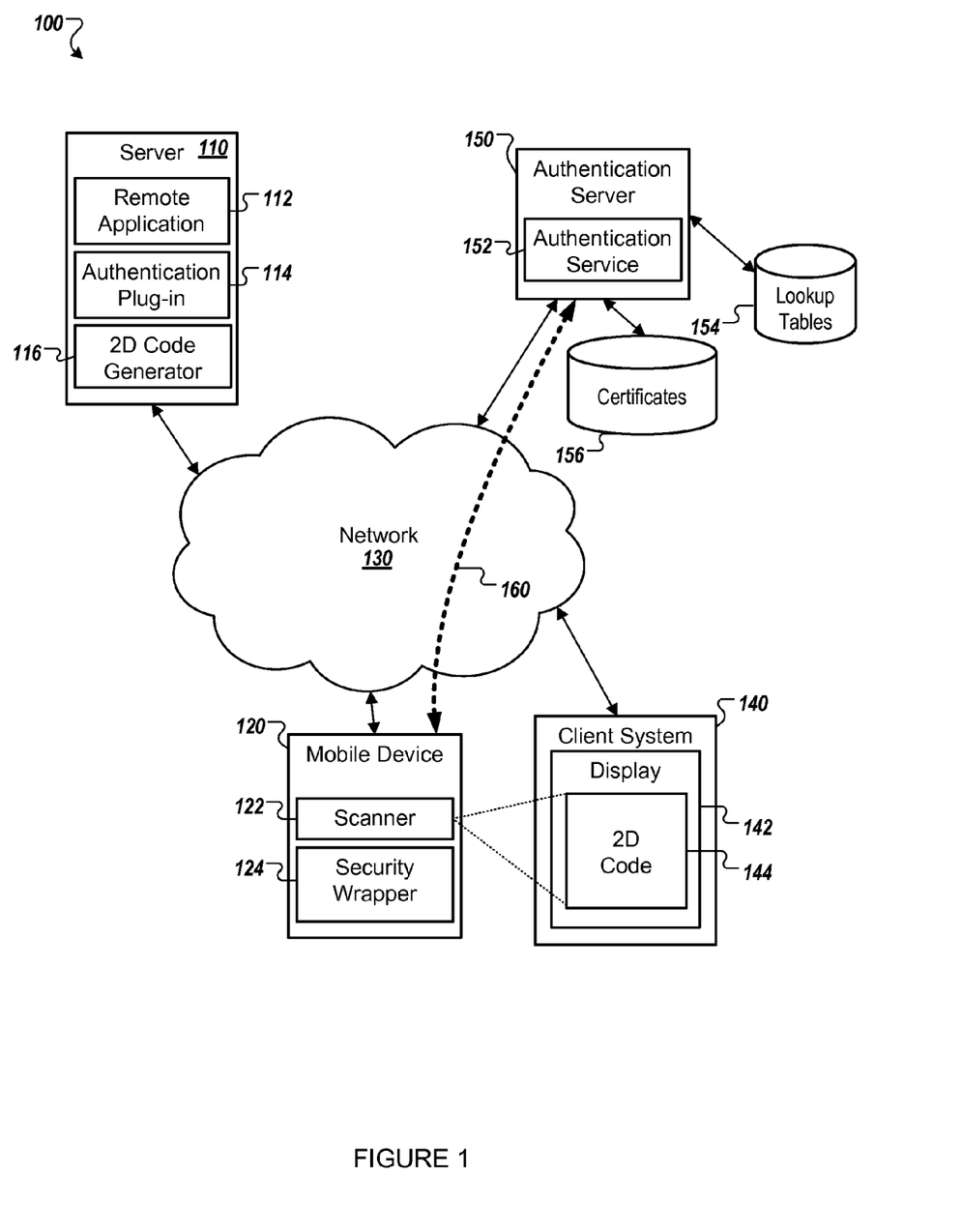
FIG. 1 is a block diagram of a system, in which embodiments of the present invention may operate, according to implementations.

Referring to the drawings, FIG. 1 is a block diagram of a system 100, in which implementations described herein may operate. The system 100 may have multiple networked computing devices including a web server 110, having a remote application 112 and an authentication plug-in 114 operating thereon, and a mobile device 120. The web server 110 may represent one or more computing devices (e.g., a server machine, a router, a personal computer, etc.) of a web service provider, the remote application 112 may represent a web resource or web service of the web service provider, and the authentication plug-in 114 may be a component (e.g., a module or an independent application) that facilitates authentication of the remote application 112 as will be discussed in more detail below, along with a two-dimensional code generator 116 which may operate in connection with the authentication plug-in 114 to provide two-dimensional codes for use in authentication. For example, the web service provider may be a retail system provider, an online news service provider, an online financial service provider, etc. that provides a website and uses two-dimensional codes such as quick response codes to simplify access of the website by users.

The mobile device 120 may be a mobile device, such as a tablet, a smartphone, a watch, glasses, or other wearable computing devices. The mobile device 120 includes a scanner 122, which in some embodiments includes a combination of hardware and software (e.g., a camera system) to enable the capturing of still images and/or video by a user of the mobile device 120. For example, the scanner 122 may include a CMOS image sensor component and an application running on the mobile device 120 to capture and process associated images. Other types of components may be used as the scanner 122 in other embodiments, such as a laser-based barcode reader or another type of image sensor. The mobile device 120 has an operating system running thereon, such as Android®, iOS®, or another such operating system, which supports the scanner 122. The scanner 122 may be used to scan two-dimensional codes, such as quick response codes, and extract information from the codes. The scanner 122 and/or the operating system of the mobile device 120 may provide the extracted information to other applications executing on the mobile device 120. As illustrated in FIG. 1, the mobile device 120 also includes a security wrapper 124, which is further discussed below.

The mobile device 120 is illustrated as scanning a two-dimensional code displayed by a client system 140. The client system 140 may be any device (e.g., a desktop or laptop computer, an electronic book, a television, an electronic billboard computer, etc.) with a display (e.g., a monitor, a digital projector, an electronic billboard, etc.) 142 coupled thereto. The web server 110 and the client system 140 may be in communication by way of a network 130. The network 130 may include one or more networks interconnected together. For example, the network 130 may be the Internet, while in another example the network 130 includes a cellular network in addition to the Internet. The client system 140 may receive one or more two-dimensional codes from the web server 110 and display them on the display 142, like the two-dimensional code 144 (labeled in FIG. 1 as a "2D Code"). As illustrated in FIG. 1, the two-dimensional code 144 may be a quick response code.

Figure 2:
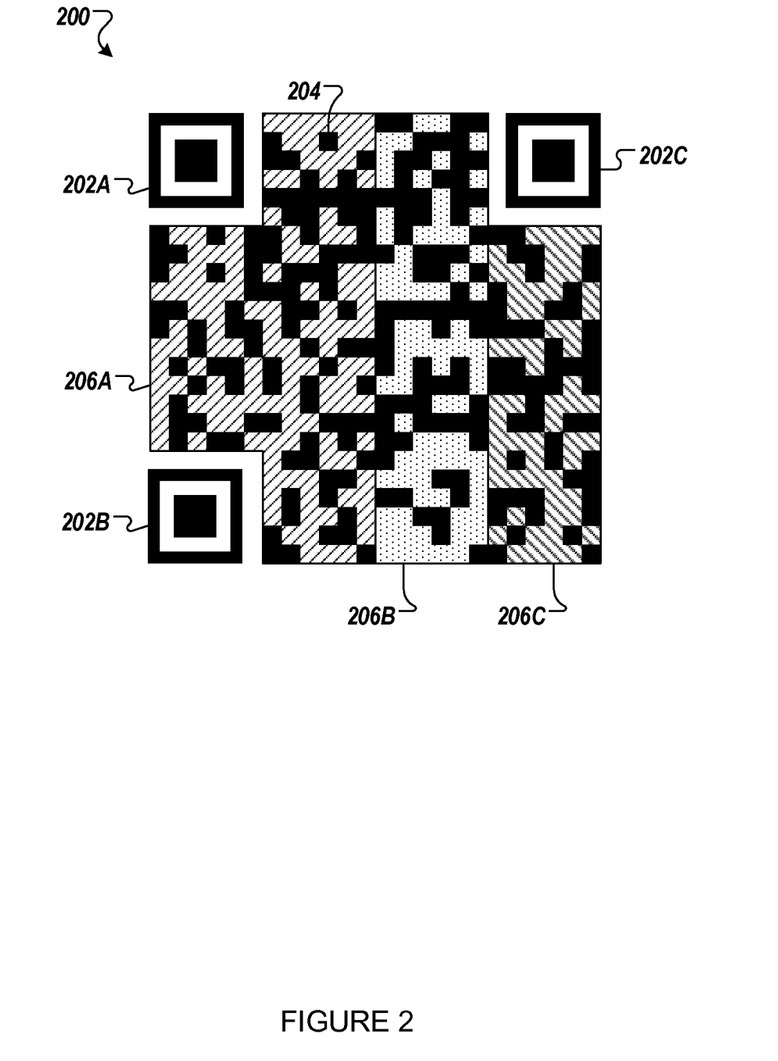
FIG. 2 is a diagram of a two-dimensional code for use in authenticating an application to a user, according to other implementations.

When the two-dimensional code 144 is scanned with the scanner 122, the security wrapper 124 receives information obtained by the scanner 122 from the two-dimensional code 144. The information is embedded or encoded into the two-dimensional code 144 upon its creation or generation. An example of a two-dimensional code 200 is illustrated in FIG. 2. The two-dimensional code 200 illustrated therein includes several components, such as a plurality of alignment marks 202A, 202B, and 202C that allow for the alignment of the two-dimensional code 200 when it is processed by a device like the mobile device 120 with the scanner 122. In the exemplary two-dimensional code 200, information is encoded by the absence or presence of a plurality of marks, like the mark 204. The marks are arranged in a grid and patterned to encode information. As illustrated, the two-dimensional code 200 includes a plurality of fields. As illustrated, the two-dimensional code includes three exemplary fields 206A, 206B, and 206C. In the two-dimensional code 200 as described herein, a field refers to a component of embedded information. The fields 206A-C may include information that is used together or each field may be used separately for a different purpose. More information regarding the fields as present in some other embodiments of the two-dimensional code 200 is provided elsewhere herein. For example, in some embodiments the field 206A may include a uniform resource locator (URL) of an authentication service, the field 206B may include a URL of a remote resource or application, and the field 206C may include a unique identifier. In some embodiments, the field 206B and 206C may be merged into a single string of characters that can be used to both determine the URL of the remote resource and uniquely identify the two-dimensional code 200.

Returning now to FIG. 1: in some embodiments, the information from the two-dimensional code 144 includes a uniform resource identifier such as a uniform resource locator (URL), or a web address, associated with the remote application 112. The two-dimensional code 144 may also include an authentication request identifier. The authentication request identifier is a code, such as a passcode, embedded in the two-dimensional code 144. More detail is provided below regarding the authentication request identifier.

In some embodiments, the URL and the authentication request identifier included in the two-dimensional code 144 is transmitted from the mobile device 120 through a secure communication channel 160 to an authentication service 152 running on an authentication server 150, which is operated by an authentication service provider. Implementations of the system 100 may use elliptic curve cryptography (ECC) algorithms to encrypt the communications between the mobile device 120 and the authentication server 150 to provide the secure communication channel 160.

To determine whether the URL included in the two-dimensional code 144 is approved or not, the authentication service 152 may perform a lookup in one of a plurality of lookup tables 154, which may include a list of approved URLs in a whitelist and/or blacklist in the lookup tables 154. In such embodiments, the authentication service 152 queries the lookup tables 154 using an authentication request that includes the URL to determine whether the remote resource identified in the two-dimensional code is approved or not. As an alternative to querying the lookup tables 154, an authorization request identifier may be extracted from the two-dimensional code and used to authorize the remote resource by comparing an expected value generated by the authentication service 152 with the authorization request identifier contained in the two-dimensional code. When the comparison indicates that the authentication request identifier matches the expected value the resource may be considered approved.

In some additional embodiments, the security wrapper 124 detects that the information extracted from the two-dimensional code 144 also identifies the authentication service 152 located on the authentication server 150. For example, the extracted information may include a URL of the authentication service 152. Based on this identifying information, the security wrapper 124 can open the secure communication channel 160, which may be a secure sockets layer (SSL) connection, through the network 130, between the mobile device 120 and the authentication server 150. The secure communication channel 160 may prevent the interception of the information exchanged between the mobile device 120 and the authentication server 150.

The authentication plug-in 114 facilitates the incorporation of scannable codes, like the two-dimensional code 144 into resources like the remote application 112 or a login page by which a user may access the remote application 112. The authentication plug-in 114 may receive information from the authentication service 152 for use by a two-dimensional code generator 116 operating in connection with the web server 110. The information may include hash functions or algorithms and may specify inputs to those functions. The two-dimensional code 144 can be displayed by the client system 140, which is in communication with the web server 110, and then scanned by the scanner 122 of the mobile device 120. In some embodiments, the two-dimensional code 144 is displayed on a display of the mobile device 120. In such embodiments, the two-dimensional code 144 may be scanned by taking a screen capture of the display. The screen capture, which includes an image of the two-dimensional code 144, may then be processed by the scanner 122.

When the security wrapper 124 opens the secure communication channel 160 between the mobile device 120 and the authentication server 150, it transmits information extracted from the two-dimensional code 144. In some embodiments, the information extracted from the two-dimensional code 144 may include a URL with multiple components: one component to identify the authentication service 152 or the authentication server 150, another component to identify the remote application 112 or the web server 110, and another that includes the authentication request identifier discussed above. In some embodiments, the identifier of the remote application 112 and the authentication request identifier may be provided as a single component, such as a single string of alphanumeric and symbolic characters, rather than as discrete components.

Referring again to FIG. 2, the multiple components of the URL in the two-dimensional code 144 may be provided by the plurality of fields 206A-C of the two-dimensional code 200, in which each of the fields includes one of the components of a URL. Thus, the two-dimensional code 144 may identify the authentication server 150 or the authentication service 152 and include information, e.g. the identifier of the remote application and/or the authentication request identifier, to transmit to the authentication server 150.

The authentication request identifier is a unique code embedded into the two-dimensional code 144 at the direction of the authentication service 152. As described herein the authentication service 152 may send information to the two-dimensional code generator 116 to permit it to generate codes that can later be confirmed as authentic by the authentication service 152. For example, the authentication service 152 may provide a specific algorithm, such as a hash algorithm, to encode the information in the authentication request identifier.

As an example, the URL in the two-dimensional code 144 may be "verify.authProvider.com/appProvider.com-629402", where "verify.authProvider.com" identifies the authentication server 150 or authentication service 152, "appProvider.com" identifies the remote application 112 or the web server 110, and "629402" is an example of an authentication request identifier or one-time code. This authentication request identifier may be sent to the authentication service 152 in a request to determine whether the remote application 112 or the web server 110 is approved by the authentication service 152. Implementations of the authentication request identifier may include alphanumeric characters and other characters suitable for use in a URL, such as ASCII characters, and may include more than the exemplary six digits presented herein for simplicity of explanation. In some embodiments, the authentication request identifier includes a sufficient number of characters such that the string of characters is effectively unique. In some embodiments the two-dimensional code 144 may include about 4,296 characters, although other embodiments may include more or fewer characters depending on the number of marks that can be included in the two-dimensional code. Additionally, the two-dimensional code may include an identifier of the remote application 112 as part of the authentication request identifier, such that a single string of characters may be used to both identify the remote application 112 or the web server 110 and provide uniqueness to the two-dimensional code.

The security wrapper 124 transmits an authentication request over the secure connection channel 160 to the authentication service 152. The authentication request includes the authentication request identifier and an identifier of the remote application to be authenticated, e.g. remote application 112. In some embodiments, the authentication request may include additional information, such as an identifier of the user and/or an identifier of the mobile device 120 used to make the authentication request. The identifier of the mobile device 120 may be an identifier unique to the mobile device 120, such as an international mobile equipment identity (IMEI) or another suitable identifier. The information may be collected and included in the authentication request by the security wrapper 124.

When the authentication service 152 receives the authentication request from the mobile device 120, the authentication service may compare the authentication request identifier with an expected value. This expected value may be generated by the authentication service 152 using the same algorithm used by the two-dimensional code generator 116 to produce the authentication request identifier as it was embedded in the two-dimensional code 144 and read by the scanner 122.

The web server 110 and the authentication server 152 may communicate through the authentication plug-in 114 to ensure that the authentication server 152 and the two-dimensional code generator 116 produce a corresponding string when processing the same input information received from the mobile device 120. The authentication service 152 may receive the input information in the authentication request, such as the identifier of the remote application, along with other information available to the authentication service 152, such as a current time or the time at which the scan was taken by the mobile device 120, and device and user information to provide the expected value. The authentication server 152 may use an authentication credential, such as one of the certificates found in the certificate database 156, that is associated with and accessible to the operator of the remote application. As described above, the operator of the remote application may be identified in one of the components of the URL by the identification of the remote application 112 or the web server 110.

When the authentication request identifier is compared to and matches the expected value, an authentication indication may be transmitted from the authentication service 152 to the mobile device 120, over the secure communication channel 160. The indication is processed by the mobile device 120 to inform a user of the mobile device 120 that the two-dimensional code 144 leads to an approved, confirmed resource. When the authentication request identifier is compared to and does not match the expected value, an authentication indication is transmitted to inform the user that the two-dimensional code 144 does not lead to an approved resource.

On the mobile device 120, the security wrapper 124 may receive the authentication indication and process it into a visual, audio, and/or tactile signal or message to the user through a user interface of the mobile device 120. For example, in some implementations, a display of the mobile device flashes green to communicate to the user that the two-dimensional code 144 leads to a confirmed resource, such as the remote application 112, or the display flashes red to indicate that the resource indicated by the two-dimensional code 144 is not a confirmed resource. The user may then be presented with an option to proceed with the request to access the resource or to prevent such a request and terminate any communication with the resource. In other embodiments, the mobile device 120 may vibrate once when the resource is a confirmed and vibrate twice when the resource is not confirmed. Other user-interface-based indications, such as "pop-up" windows, chimes, etc., may be generated by the mobile device 120 to communicate the status of the resource identified by the two-dimensional code 144 to the user.

In this way, the user of the mobile device 120 may more easily determine whether a quick response code, or other two-dimensional code, leads to a confirmed source. This may permit the user of the mobile device 120 to be and to feel more secure in using two-dimensional codes, and the use of such codes, as described herein, may permit the operator of the remote application 112 to more conveniently and securely provide an associated service, such as an e-commerce service, to the user. In this way, the system 100 may be used to authenticate the remote application 112 to the mobile device 120. Many providers of remote applications can acquire two-dimensional codes from the authentication service operator, using an authentication plug-in 114 provided by the operator of the authentication service 152. The same infrastructure illustrated in the system 100 can be used by the user of the mobile device 120 to ensure that scanned two-dimensional codes for many different web sites are approved and will direct the user to a confirmed website.

The system 100 of FIG. 1 may also provide two-way authentication: permitting the user of a web application to ensure the desired web application is accessed and permitting the operator of a web application to more easily provide secure access to the user. In such implementations, the same connections between the features of the system 100 are used.

In some such implementations, the client system 140 may be used by a user to request access to the remote application 112 running on the web server 110 over the network 130. As part of a login process, the client system 140 is directed to a login screen which may request a username and password associated with the user as some conventional applications may do.

In response to the request from the client system 140 to access the remote application 112, the two-dimensional code generator 116 running on the web server 110 may generate a two-dimensional code. In some instances, the two-dimensional code generator 116 may request information from the authentication service 152, through the authentication plug-in 114 or directly, for use in generating the two-dimensional code. For instance, the two-dimensional code generator 116 may request an algorithm or hash function to be used in generating the two-dimensional code. The two-dimensional code generator 116 may store a plurality of such algorithms, received from the authentication service 152. The request for the two-dimensional code may include information obtained from the access request sent from the client system 140 to the web server 110. For example, this may include a time of the access request, an internet protocol (IP) address and/or a media access control (MAC) address identifying the source of the access request, and a username and/or password, etc. The two-dimensional code generator 116 may process the included information with a selected algorithm to generator the two-dimensional code, including an authentication request identifier that is unique to the request sent by the client system 140 to access the web application 110.

As discussed herein, the authentication request may be unique to the specific session with the remote application initiated by the client system. If the session ends, and the user attempts to access the remote application again, a new authentication request identifier may be included in a new two-dimensional code 144 provided by the two-dimensional code generator 116. The client system 140 then displays the two-dimensional code 144 on a display 142, such as the display of a laptop computer. The user may then scan the two-dimensional code 144 using the scanner 122 of the mobile device 120.

As described herein, a secure communication channel is opened by the security wrapper 124 to the authentication server 150 to confirm that the two-dimensional code is for an approved resource. An indication may be returned to the mobile device 120 and interpreted thereby for the user by the security wrapper 124. In this way, a third-party (the authentication service provider) can verify to the user that the remote application the user intends to access is the remote application that is actually being accessed.

The remote application 112 may prompt the user, through the client system 140 for additional information, such as a username, a password, and/or a personal identification number (PIN) for use in authentication the user to the remote application 112. The user can enter the additional information using the client system 140 or the mobile device 120, having confidence that the additional authentication information is being presented to an approved resource. In some embodiments, the remote application 112 may cause the client system 140 to request the username and password of the user after requesting and/or displaying the two-dimensional code 144. In such embodiments, the client system 140 may receive the PIN for use in authenticating the user to the remote application 112. This PIN may be requested by the remote application 112 and entered through the client system 140 after the user of the client system 140 and mobile device 120 is satisfied that the remote application 112 is an approved application. In this way, the system 100 may permit a user to avoid entering at least some identifying authentication information, whether a username, password, PIN, or other information, until assured by the authentication service 152 that the remote application 112 is the desired application, rather than a malicious web application.

In some embodiments, one or more of the username, password, and PIN may be requested by the remote application 112 before the user is presented with the two-dimensional code 144. For example, the user may provide a username and password to the remote application 112, which rather than logging on the user, may present the user with the two-dimensional code 144. After the user scans and authenticates the two-dimensional code, the user may then enter a PIN. This way, at least some information from the user is only entered to a website in which the user has confidence because of an authentication indication received from the authentication service 152.

In another implementation, the system provides two-way authentication using the mobile device 120 without using a separate client system 140. The mobile device can request to access to the remote application 112. The request and/or information in the request may include the International Mobile Station Equipment Identity (IMEI) of the device 120.

The web server 110 may include a database of user information that links the IMEI of the mobile device 120 to a particular user account. In this way or in other ways, the initial request to connect to the mobile device 120 may provide information preliminarily identifying the user of the mobile device 120 to the remote application 112. As part of an authentication process, the remote application 112 requests the creation of a two-dimensional code from a two-dimensional code generator 116. This authentication code creation request may include a unique session identifier, the IMEI of the device 120, or other information, including user-entered information such as a password, a username, or a PIN, and may identify the resource (e.g., the remote application 112) being accessed, as a server or as an application. Other information may be included in the code creation request in other embodiments.

For example, the request from the remote application 112 may include policy information. For example, the policy information may require that the generated two-dimensional code be valid for a specified period of time. In some embodiments, policy information may include the type of devices and/or operating systems running thereon that may be used to connect to the remote application 112, when the two-dimensional code is used to authenticate the remote application 112 to a user. A particular validation process may also be specified by policy information. Other policies may specify certificate management features, such as a revocation list and certificate chain validation requirements. The remote application 112 may also permit the owner of the mobile device 120 to implement certain policies with respect to the device. For example, a parent who provides a mobile device 120 to a child may limit the child's access to certain remote applications, such as specific online stores, while granting access to others. The mobile device 120 may provide such user requirements to the remote application in advance to store them in a local storage for subsequent use.

The two-dimensional code generator 116 uses information provided in the code creation request, such as the IMEI of the device 120 or another unique session identifier, policy information, etc., to generate a unique two-dimensional code as described herein.

The two-dimensional code is sent to the remote application 112, which then causes the two-dimensional code to appear on a display of the mobile device 120. In such instances, rather than using the hardware features of the scanner 122 to scan the two-dimensional code, the scanner 122, or another application running on the mobile device 120, is configured to obtain a screen-shot or screen-capture of the display of the mobile device 120. This image is then processed by the scanner 122 to extract information embedded in the two-dimensional code, such as the authentication request identifier. The URL extracted from the information embedded in the two-dimensional code can be intercepted by the security wrapper 124, which opens a secure communication channel with the authentication server 150. The security wrapper 124 sends an authentication request, including the authentication request identifier extracted from the two-dimensional code, to the authentication service 152. In some embodiments, before the authentication request is sent, the application 112 may cause the mobile device 120 to prompt the user to enter some authentication information, such as one or more of a username, a password, and a PIN. Upon entry of any required information, the security wrapper 124 may issue the authentication request to the authentication service 152.

The authentication service 152 receives the request from the security wrapper 124 and validates the request as described herein. The authentication service 152 may return an indication to the mobile device 120 that the remote application 112 is an approved device, and the authentication service 152 may also return an authentication credential, e.g. a public key, for the mobile device 120 to use in connecting to the remote application 112. The authentication server 150 may be in communication with a database containing digital security certificates 156 and/or other credentials, such as keys, from customers of the authentication service provider. The digital certificates or keys may be used as credentials when a customer requests information for use in generating two-dimensional codes for display by the customer's web server 110. The authentication service provider that operates the authentication service 152 may also operate a certificate authority and, thus, may more easily use the certificates in providing the authentication service.

Using the example of the public key as the authentication credential, the public key may be provided based on the IMEI of the mobile device 120 and other factors associated with the request. In some embodiments, the public key may already be stored on the mobile device 120 and the authentication service may respond to the authentication request from the mobile device 120 by providing a certificate for the remote application 112 to use in authenticating the mobile device 120. The mobile device 120 may then provide the public key to the remote application 112 to authenticate the mobile device 120 to the remote application.

In some implementations the key is also linked to a digitally-signed validation code provided by the authentication server 150. Policies may be used to govern the provision of unique keys. These policies may be determined by the operator of the remote application 112, and enforced, at least partially, by the authentication server 150. Policies may specify the types or numbers of devices that can use the associated key. For example, a mobile device having an outdated version of a particular operating system running thereon may be denied a key by the authentication server 152, because of a policy of the remote application 112 barring devices with the version of the operating system running thereon. While such policies may be enforced by the web server 110 in denying a two-dimensional code, the policies may also be enforced by the authentication service 152 in denying a key or other such authentication credential.

Thus, multiple factors are included in the authentication process to increase the security of the process. The communications, the requests and response between the web server 110, the authentication server 150, the client system 140, and/or the mobile device 120, may be conducted over a secure communication channel to prevent a man-in-the-middle type attack. The authentication service 152 may monitor requests to prevent replay attacks against the web server 110.

In this way, the mobile device 120 can be authenticated to the remote application 112 and the remote application 112 can be validated to the mobile device 120 by using the two-dimensional code generated according to the authentication service 152. The operator of the remote application 112 can outsource the infrastructure and management of the authentication service 152 to a third-party. The operator of the authentication service 152 can provide the same services to other operators of remote applications, alleviating the remote application operators of providing a robust authentication system and potentially providing a more consistent interface for a user of those applications. Additionally, much of the processing is provided by the authentication server 150, thus offloading processing burdens from the mobile device 120 which may be normally run on an internal battery with limited capacity.

Figure 3:
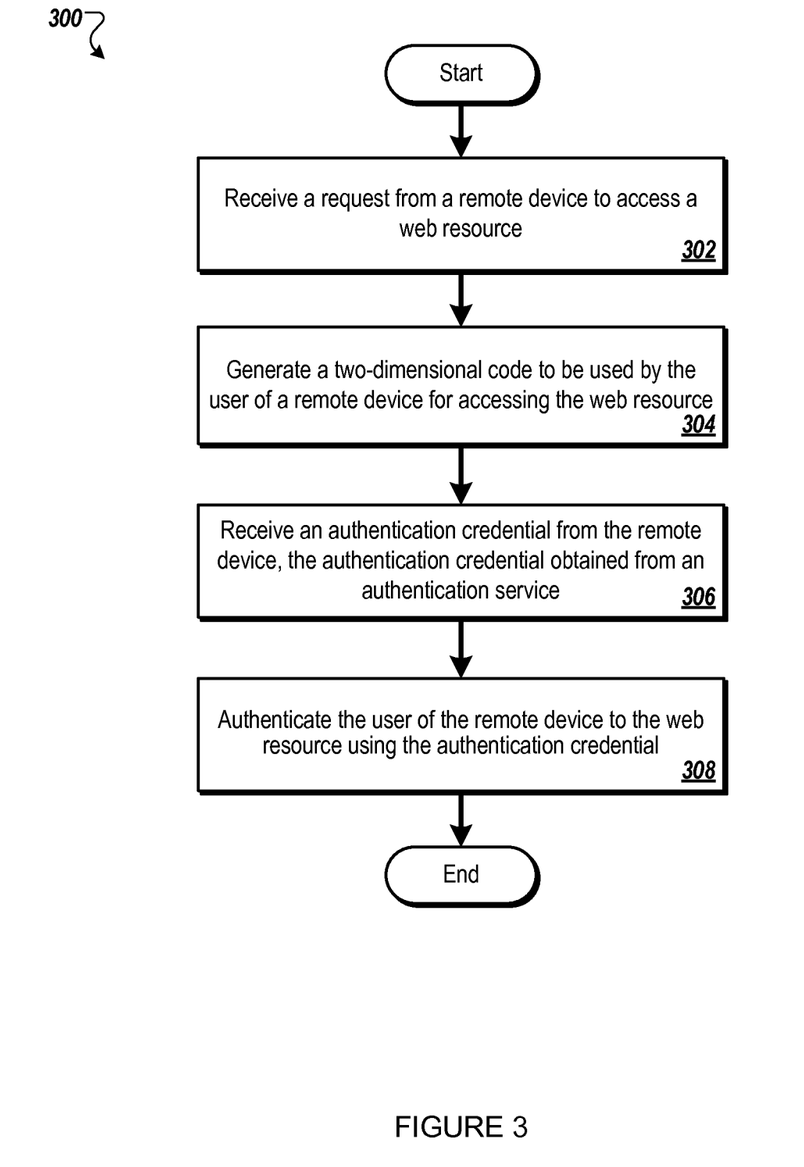
FIG. 3 is a flow diagram illustrating a method for authenticating a user to a web resource being accessed remotely by the user, according to implementations.

Referring now to FIG. 3, a flow diagram illustrating a method 300 for authenticating a user to a remote resource, in accordance with some aspects of the present disclosure. The method 300, like other methods described herein, may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the method of this disclosure is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any non-transitory computer-readable device or storage media. In one implementation, method 300 may be performed by the web server 110 of FIG. 1.

Accordingly, in some implementations the method 300 begins at block 302 in which processing logic receives a request from a remote device to access a web resource. For example, the user of a mobile device may request access to a web application, using either a mobile device or a client system. The web application may run on a web server that receives the request from the mobile device or the client system. The request from the remote device, whether a mobile device or a client system, may include information regarding a mobile device, such as username and/or password, a session identifier, and other information about the device itself. The request may specify a particular web application from a plurality of web applications running on the web server. In response to the request, the web resource may request a two-dimensional code from a two-dimensional code generator operating on the processing logic of the remote device to send the two-dimensional code to the mobile device At block 304, the processing logic may generate the two-dimensional code and send it to the remote device. The two-dimensional code may then be sent from the remote device to an authentication service. For example, the two-dimensional code may be sent from the mobile device. The two-dimensional code includes an identifier of the authentication service. The two-dimensional code may include multiple components, such as the identifier of an authentication service and a unique authentication request identifier, as described above in connection with two-dimensional code 144 of FIG. 1 and code 200 of FIG. 2. The authentication service may compare the authentication request identifier and compare it to an expected value generated by the use. When a match is detected, the authentication service may send an authentication indication and an authentication credential to the mobile device.

At block 306, the processing logic receives an authentication credential from the remote device. As discussed, the authentication credential may be received from the authentication service in response to an authentication request sent by the mobile device of the user. The authentication request includes information extracted from the two-dimensional code. For example, the two-dimensional code may include an identifier of the authentication service so that an authentication request may be submitted to it. The authentication request may further include information about the mobile device, such as a type of the mobile device, an operating system thereof, or an IMEI of the mobile device.

The two-dimensional code may further include an authentication request identifier that may be compared with an expected value generated by the authentication service. If the authentication request identifier matches the expected value, the authentication credential may be provided to the mobile device in response to the authentication request. The two-dimensional code generator and the authentication service may share information, such as a two-dimensional code generation algorithm or hash function and associated input requirements for use in generating the two-dimensional code and in generating the expected value. By using the same algorithm and input information, the authentication request identifier and the expected value may match, even though the authentication request identifier and the expected value may contain sufficient characters to be essentially unique. When the authentication request identifier and the expected value do not match, no authentication credential is provided to the mobile device. The authentication credential may include a key, a certificate, and/or a digitally signed validation code.

At block 308, the processing logic authenticates the remote device to the web resource by using the authentication credential. The authentication credential may be used in conjunction with user-provided information, such as a username, a password, and/or a PIN when the information has not already been provided to the web resource. As described herein, the authentication credential may be a key to use in authenticating the mobile device to the remote resource. The key may be linked to a public certificate of the web server of the remote resource. In some embodiments, the authentication credential, or credentials in some additional embodiments, may include a digitally-signed validation code provided by the web server. This validation code may be provided to the mobile device by the authentication service. The mobile device may then provide the validation code to the web resource to authenticate the mobile device and/or a user thereof to the web resource.

Embodiments of the method 300 may permit a user of a remote resource, such as the mobile device 120, to authenticate to the web resource and to receive assurance that the web resource being accessed is an approved resource, i.e. that no malicious actor has redirected the user in attempt to gain important personal information from the user, such as login information. The authentication process described by method 300 also provides additional authenticating factors to the remote resource to ensure only authorized users are granted access. Embodiments of the method 300 may operate within the system 100 of FIG. 1 and as described herein.

Figure 4:
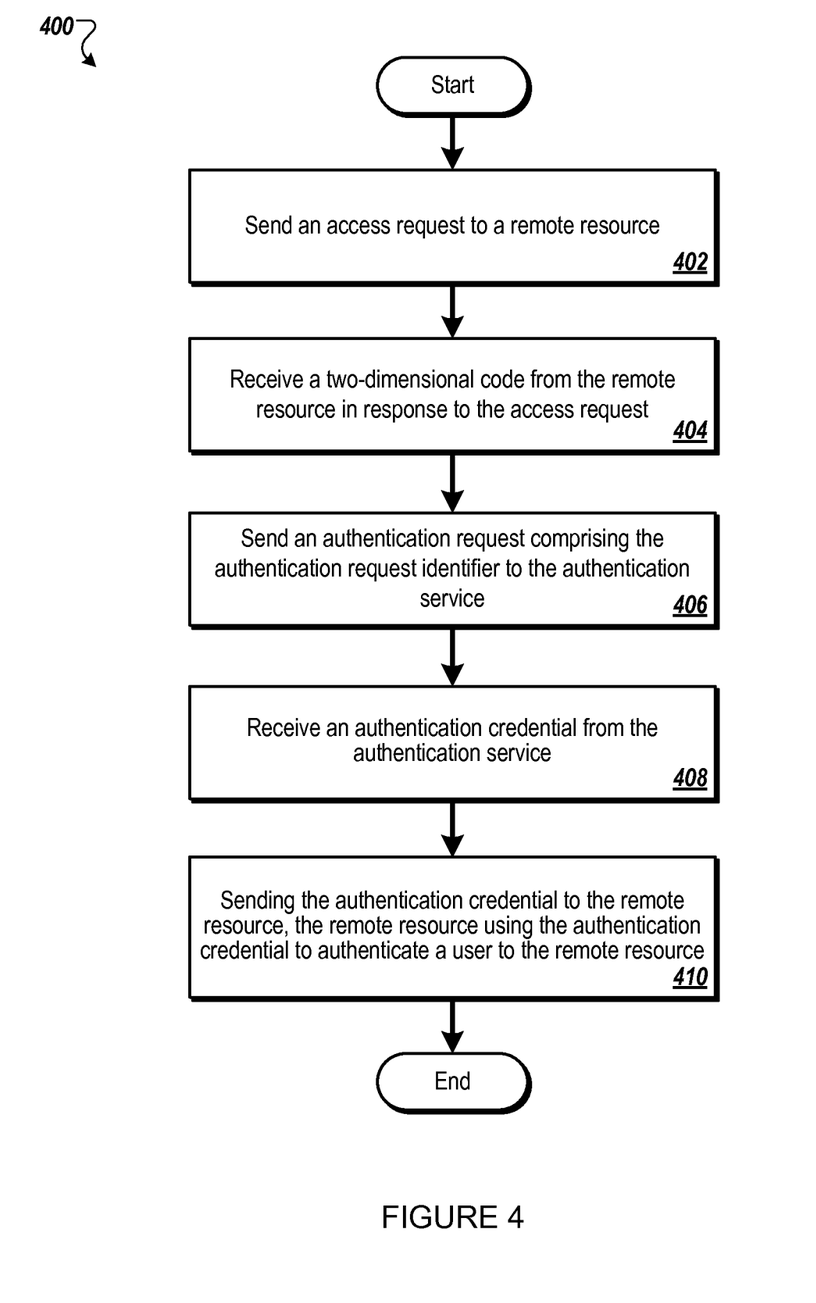
FIG. 4 is a flow diagram illustrating a method for authenticating a user to a remote web resource, according to implementations.

Referring now to FIG. 4, a flow diagram illustrating a method 400 for authenticating a user to a remote resource, in accordance with some aspects of the present disclosure. The method 400, like other methods described herein, may be performed by processing logic that comprises hardware (e.g., circuitry, dedicated logic, programmable logic, microcode, etc.), software (e.g., instructions run on a processing device to perform hardware simulation), or a combination thereof.

Embodiments of the method 400 may begin at block 402 in which processing logic sends an access request to a remote resource. For example, the mobile device 120 of FIG. 1 may send a request to the remote application 112 on the web server 110. The request may be sent at the direction of a user of the mobile device 120. The access request may be a request to access a remote request such as an online banking resource or a corporate intranet, etc. At block 404, the processing logic receives a two-dimensional code from the remote resource. The two-dimensional code is sent by the remote resource and may be generated by the remote resource, and subsequently received by the processing logic, in response to the access request. The two-dimensional code includes an authentication request identifier. For example, the remote application 112 may cause a two-dimensional code to be transmitted to the mobile device 120. In some embodiments, the two-dimensional code may be generated by a two-dimensional code generator 116 running on the web server 110 using information, such as a hash function and/or input requirements, obtained from the authentication service 152 through the authentication plug-in 114. The web server 110 may generate the two-dimensional code in response to receiving the access request from the mobile device 120.

At block 406, the processing logic sends an authentication request to the authentication service. The authentication request includes the authentication request identifier and may also include an identifier of the remote resource. Thus, the mobile device 120 may extract information, including the authentication request identifier, from the two-dimensional code and include that information in the authentication request. The authentication request is sent to the authentication service to determine whether the remote resource is approved by the authentication service 152. In this way the user of the mobile device 120 may have confidence in the remote application 112. The authentication service 152 may compare the authentication request identifier with an expected value that is generated by the authentication service 152 using the same information and hash functions used by the two-dimensional code generator 116 to generate the authentication request identifier. When the authentication request identifier and the expected value match, the authentication service 152 may transmit an authentication indication to the mobile device 120, which may process the authentication indication to communicate the indication to a user of the mobile device 120.

At block 408, the processing logic receives an authentication credential from the authentication service. For example, as illustrated in FIG. 1, the authentication server 150 is in communication with a database storing a plurality of certificates 156. The authentication request may include information obtained from a user of the mobile device 120 and information obtained from the mobile device 120, such an IMEI of the device. That information may be used by the authentication service 152 to determine that the authentication credential can be provided to the mobile device 120. In some embodiments, one or more of a username, a password, and a PIN may be sent to the authentication service 152 from the mobile device 120 in order to determine that the authentication credential is to be provided to the mobile device 120. The authentication credential may be sent by the authentication service 152 to the mobile device 120 along with the authentication indication.

At block 410, the processing logic sends the authentication credential to the remote resource for the remote resource to use in authenticating a user to the remote resource. For example, a certificate received from the database of certificates 156 may be sent from the mobile device 120 to the remote application 112. The remote application 120 may use the certificate to authenticate the mobile device 120 to the remote application. In some embodiments, the authentication may be a unique key. The key may be unique to the user of the mobile device 120 and thus may serve to authenticate the mobile device 120 of the user to the remote application 112. After the mobile device 120 is authenticated to the remote application 112, the user may be permitted to access data and services associated with the remote application 112 as provided by the remote application 112.

Figure 5:
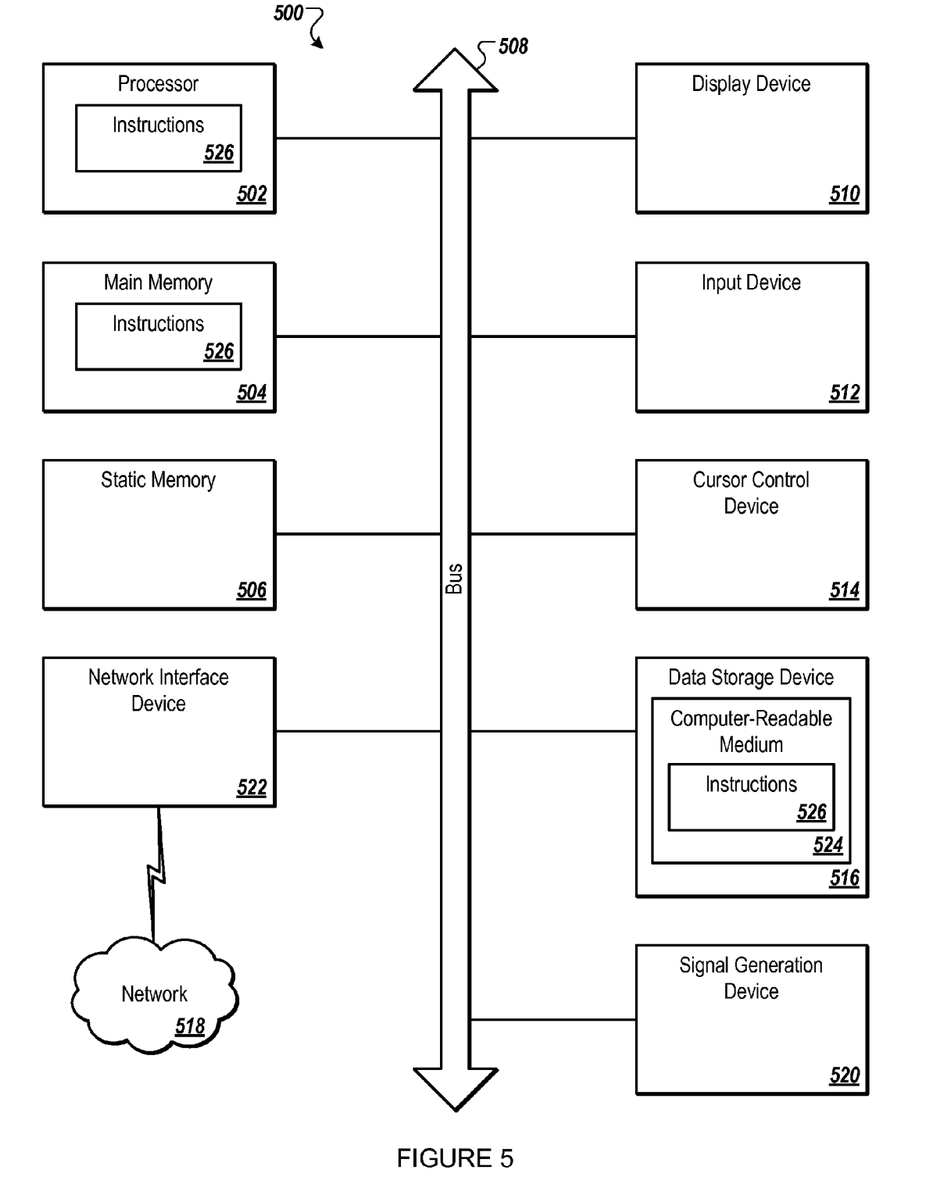
FIG. 5 is a block diagram illustrating one embodiment of a computer system, according to implementations.

FIG. 5 illustrates a diagrammatic representation of a machine in the form of a computer system 500 within which a set of instructions, for causing the machine to perform any one or more of the methodologies discussed herein, may be executed. The system 500 may be in the form of a computer system, such as a server computer system or a client computer system, within which a set of instructions, for causing the machine to perform any one or more of the methodologies discussed herein, may be executed. In alternative embodiments, the machine may be connected (e.g., networked) to other machines in a LAN, an intranet, an extranet, the Internet, or in a network architecture like that of system 100 of FIG. 1. The machine may operate in the capacity of a server machine or a client machine in client-server network environment The machine may be a personal computer (PC), a mobile device, a tablet, a smartphone, a TV, a laptop computer, a wearable computer, a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 500 may represent the web server 110 of FIG. 1. In another implementation, the computer system 500 may represent the mobile device 120 or the authentication server 150 of FIG. 1.

The example computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 may be configured to execute the authentication service 152 for performing the operations and steps discussed herein. The processor 502 may also be configured to execute the security wrapper 124 for performing the associated operations discussed herein.

The computer system 500 may further include a network interface device 522, which may include interfaces for wired and/or wireless communications. The computer system 500 also may include a video display unit 510 (e.g., a liquid crystal display (LCD) or light emitting diode display (LED)), an alphanumeric input device 512 (e.g., a physical keyboard or virtual keyboard), a cursor control device 514 (e.g., a mouse or touch screen), and a signal generation device 520 (e.g., a speaker).

The data storage device 516 may include a computer-readable medium 524 on which is stored one or more sets of instructions 526 (e.g., instructions for a web application 112, a two-dimensional code generator, 116, a two-dimensional an authentication service 152, a security wrapper 124, etc., or instructions corresponding to method 300) embodying any one or more of the methodologies or functions described herein. The instructions 526 may also reside, completely or at least partially, within the main memory 504 and/or within processing logic of the processor 502 during execution thereof by the computer system 500, the main memory 504 and the processor 502 also constituting computer-readable media. The instructions may further be transmitted or received over a network 518 via the network interface device 522.

While the computer-readable storage medium 524 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transient medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The present description sets forth numerous specific details such as examples of specific systems, components, methods, and so forth, to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "generating", "communicating", "determining", "identifying", "authenticating", "comparing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a tangible computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions. The computer readable storage medium is non-transitory.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A system comprising:
   a memory;
   a processor, coupled to the memory, to:
   receive a request from a remote device to access a web resource, the web resource operating on the processor;
   generate a two-dimensional code to be sent from the remote device to an authentication service to authenticate the web resource, the two-dimensional code comprising an authentication request identifier and an identifier of the authentication service, wherein the authentication service is to compare the authentication request identifier generated by the processor in view of a URL of the web resource processed with an algorithm with an expected value generated by the authentication service in view of the URL of the web resource processed with the algorithm, the two-dimensional code further comprising policy information that describes a policy of the web resource;
   receive an authentication credential from the remote device when the authentication request identifier matches the expected value, the authentication credential being received by the remote device from the authentication service in response to an authentication request sent by the remote device to the authentication service, wherein the authentication request comprises the authentication request identifier as extracted from the two-dimensional code, and wherein the authentication credential comprises a public key used by the web resource to authenticate a user to an application running on the processor; and
authenticate the remote device to the web resource using the authentication credential.

2. The system of claim 1, wherein the two dimensional code further comprises an identifier of the web resource.

3. The system of claim 1, wherein the two-dimensional code is generated by a two-dimensional code generator provided by the processor according to information received from the authentication service.

4. The system of claim 1, wherein the two-dimensional code is provided to the remote device in response to the request from the remote device to access the web resource.

5. The system of claim 1, wherein the two-dimensional code is generated according to information received from the authentication service.

6. The system of claim 1, wherein the authentication service receives policy information from the web resource, the policy information describing a policy of the web resource.

7. The system of claim 1, wherein the remote device comprises a mobile device used to scan the two-dimensional code being displayed on a display of a client system.

8. A method comprising:
receiving a request from a remote device to access a web resource, the web resource operating on a processing device;
generating, by the processing device, a two-dimensional code to be sent from the remote device to an authentication service to authenticate the web resource, the two-dimensional code comprising an authorization request identifier and an identifier of the authentication service, wherein the authentication service is to compare the authentication request identifier generated by the processing device in view of a URL of the web resource processed with an algorithm with an expected value generated by the authentication service in view of the URL of the web resource processed with the algorithm, the two-dimensional code further comprising policy information that describes a policy of the web resource;
receiving an authentication credential from the remote device when the authentication request identifier matches the expected value, the authentication credential being received by the remote device from the authentication service in response to an authentication request sent by the remote device to the authentication service, wherein the authentication request comprises the authentication request identifier as extracted from the two-dimensional code, and wherein the authentication credential comprises a public key used by the web resource to authenticate a user to an application running on the processor; and
authenticating the remote device to the web resource.

9. The method of claim 8, further comprising providing the two-dimensional code to remote device in response to the request from the remote device to access the web resource.

10. The method of claim 8, wherein the two dimensional code comprises an identifier of the web resource.

11. The method of claim 8, wherein the two-dimensional code is generated by the processing device and is generated according to information received from the authentication service.

12. The method of claim 11, wherein the authentication service retains sufficient information to generate the expected value corresponding to the authentication request identifier embedded in the two-dimensional code.

13. The method of claim 8, wherein the authentication credential is received by the remote device in response to a comparison between the authentication request identifier and the expected value generated by the authentication service.

14. The method of claim 13, wherein the authentication service receives policy information from the web resource, the policy information describing a policy of the web resource.

15. A non-transitory computer-readable storage medium including instructions that, when executed by a processor, cause the processor to perform a set of operations comprising:
receiving a request from a remote device to access a web resource;
generating a two-dimensional code to be sent by a user of the remote device to an authentication service to authenticate the web resource, the two-dimensional code comprising an authentication request identifier and an identifier of the authentication service, wherein the authentication service is to compare the authentication request identifier generated by the processor in view of a URL of the web resource processed with an algorithm with an expected value generated by the authentication service in view of the URL of the web resource processed with the algorithm, the two-dimensional code further comprising policy information that describes a policy of the web resource;
receiving an authentication credential from the remote device when the authentication request identifier matches the expected value, the authentication credential being obtained by the remote device from the authentication service in response to an authentication request sent by the remote device to the authentication service, wherein the authentication request comprises the authentication request identifier as extracted from the two-dimensional code, and wherein the authentication credential comprises a public key used by the web resource to authenticate a user to an application running on the processor; and
authenticating the remote device to the web resource using the authentication credential.

16. The non-transitory computer-readable storage medium of claim 15, further comprising communicating policy information to the authentication service.

17. The non-transitory computer-readable storage medium of claim 15, further comprising requesting information from the authentication service for use in generating the two-dimensional code, the information comprising the algorithm, wherein the algorithm comprises a hash algorithm.

18. The non-transitory computer-readable storage medium of claim 15, wherein the two dimensional code comprises an identifier of the web resource.

* * * * *